Aug. 29, 1961
R. J. HAEFNER ET AL
2,997,992
COLD STARTING ENRICHMENT MEANS
Filed Sept. 10, 1956
3 Sheets-Sheet 1
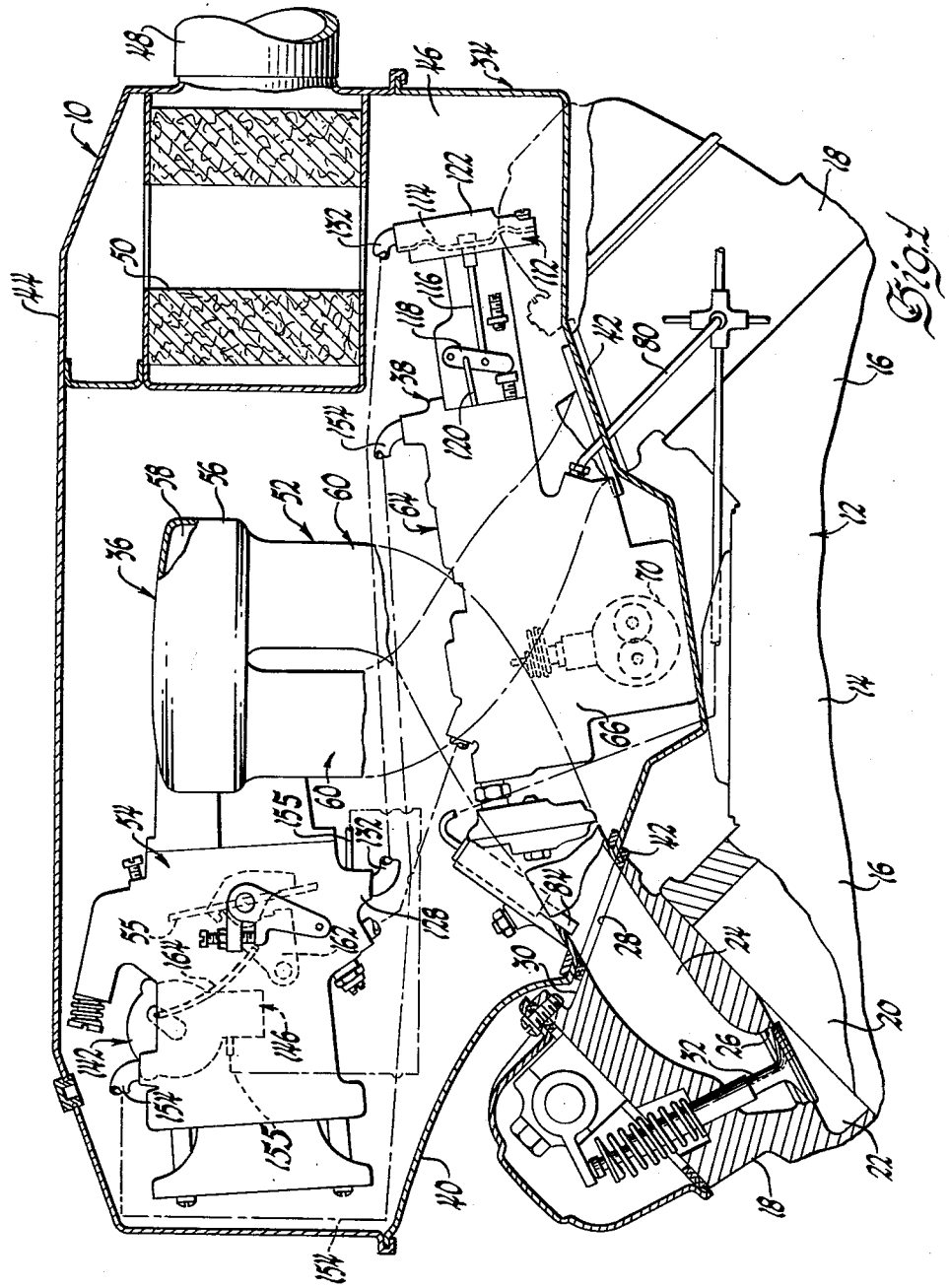
INVENTORS
Raymond J. Haefner, &
BY George P. Ransom
L. D. Burek
ATTORNEY

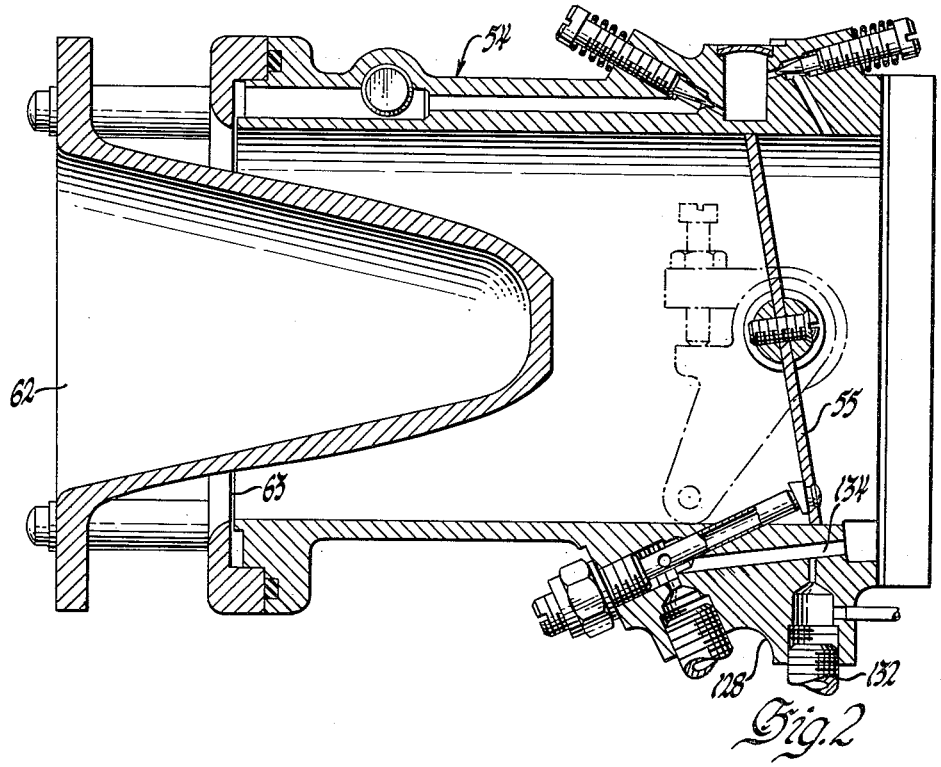
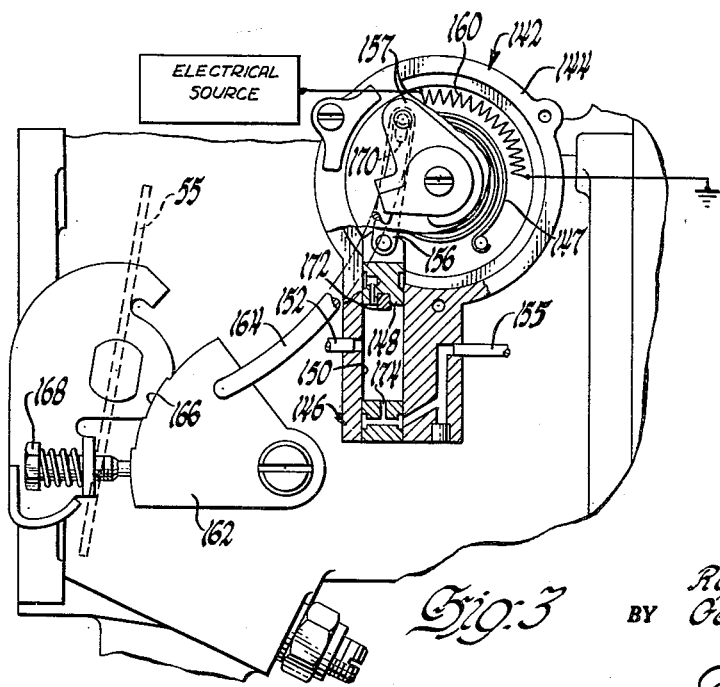

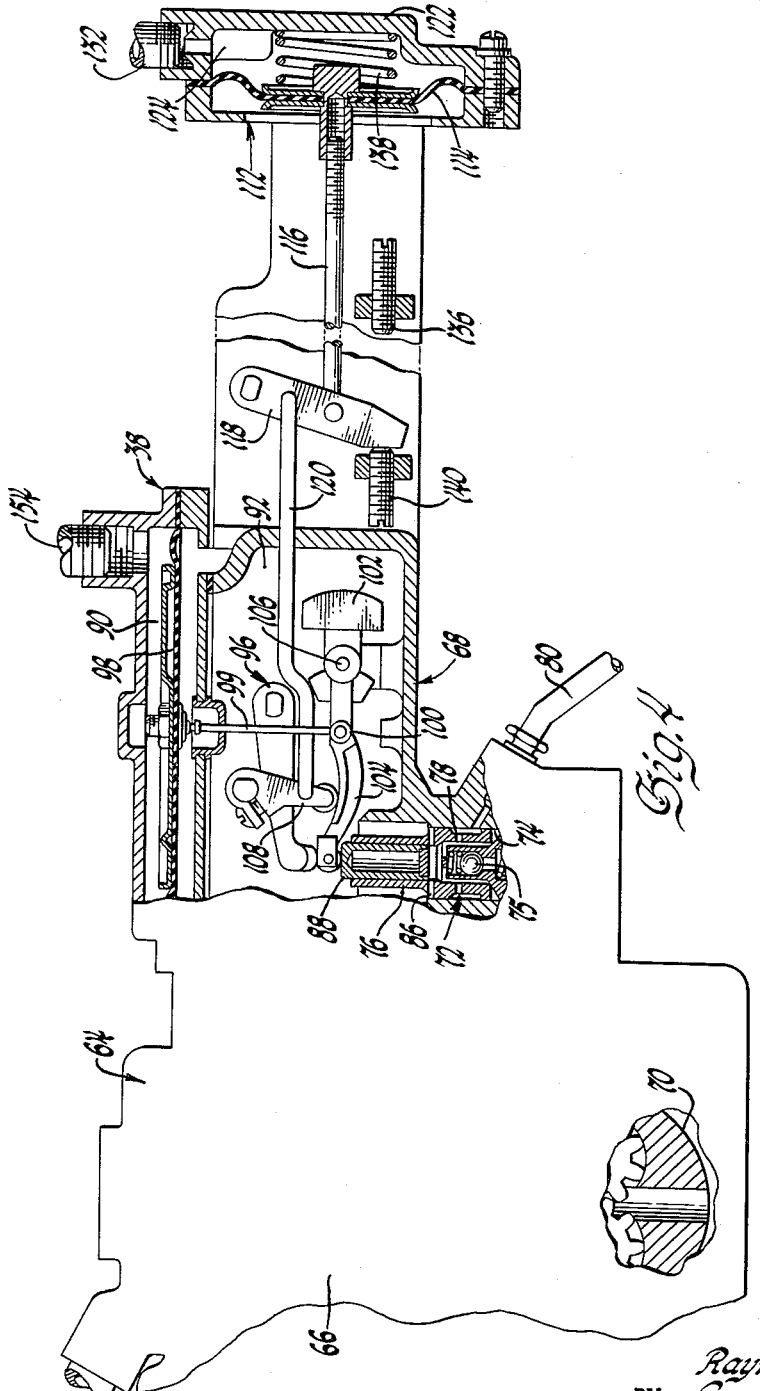

United States Patent Office 2,997,992
Patented Aug. 29, 1961

2,997,992
COLD STARTING ENRICHMENT MEANS
Raymond J. Haefner, Utica, and George P. Ransom, Berkley, Mich., assignors to General Motors Corporation, Detroit, Mich., a corporation of Delaware
Filed Sept. 10, 1956, Ser. No. 608,938
10 Claims. (Cl. 123—119)

The present invention relates to charge forming means for internal combustion engines and more particularly to fuel injection systems therefor that are adapted to inject metered quantities of fuel into the combustible charge.

In the operation of an internal combustion engine of the spark ignited variety certain advantages can be derived from injecting the metered fuel into the charge in the induction passages immediately adjacent the intake valves. However, in spite of these advantages, so far fuel injection has not been widely adopted for several reasons. One of the reasons resides in the fact that although some injection systems are capable of injecting the fuel into the charge in some predetermined proportion to the air flow, they have not been able to entirely satisfactorily change the proportions of the resultant charge during some operating conditions, particularly when the engine is operating at subnormal temperatures.

It is now proposed to provide a charge forming unit which employs a fuel injection system having simple, inexpensive and reliable means therein for enriching the charge when the engine is operating at subnormal temperatures. This is to be accomplished by providing a fuel metering control unit in the injection system which includes a diaphragm responsive to the volume of air flowing through the induction system and a valve that is responsive to the fuel flow and which is interconnected with the diaphragm by a linkage so that the two may be retained in balance. A thermostatic element is provided which is responsive to operating conditions in the engine and is effective to change the mechanical advantage of the linkage to thereby modify the metering action of the control unit whenever the temperature of the engine necessitates a richer charge.

In the drawings:

FIGURE 1 is a cross-sectional view of a charge forming unit embodying the present invention installed on an internal combustion engine.

FIGURE 2 is a cross-sectional view of the air metering mechanism.

FIGURE 3 is a side view of the air meter.

FIGURE 4 is a side view of the fuel metering mechanism with portions thereof being broken away.

Referring to the drawings in more detail the present invention may be incorporated in a charge forming unit 10 adapted to be employed on any suitable internal combustion engine 12. In the present instance the engine 12 is of the so-called V-type having a cylinder block 14 with a pair of angularly disposed banks 16 of cylinders 20. Each bank 16 includes a row of aligned cylinders 20 with a cylinder head 18 secured to the top thereof to close the ends of the cylinders and thereby form combustion chambers 22. Separate intake passages 24 extend transversely through the cylinder heads 18 for each of the cylinders with the inner ends thereof forming intake valve seats 26 opening into the combustion chambers 22 and the outer ends forming rows of intake ports 28 extending along the faces 30 on the insides of the cylinder heads 18. Intake valves 32 are disposed in the valve seats 26 to be actuated from a camshaft for timing the admission of the charge into the combustion chambers 22.

The charge forming unit 10 is enclosed in a shroud 34 of sheet metal and includes an air induction system 36 and a fuel injection system 38. The shroud 34 is fabricated from some suitable material such as sheet metal and includes a lower member 40 removably secured to the faces of the cylinder heads 18 so as to rest on thermal insulating means 42. A cover 44 is secured to the lower member 40 to form an airtight, enlarged plenum chamber 46. The shroud 34 not only encloses the charge forming means but also forms an integral part of the induction system by having an inlet 48 in the side thereof that is adapted to draw the air from the atmosphere. This inlet 48 may include a suitable air cleaner or filter element 50 for removing dust, etc. from the air in order to protect the working parts of the engine 12.

The induction system 36 in addition to the shroud 34 also includes an intake manifold 52 and an air meter 54 that are disposed in the plenum chamber 46. The intake manifold 52 is a rigid self-supporting structure having a main body 56 that forms a central chamber 58 and a plurality of substantially identical ram pipes 60 that extend downwardly from the main body 56 to be secured to the faces 30. The upper ends of these ram pipes 60 open into the central chamber 58 while the lower ends register with the intake ports 28 so as to form separate induction passages. In order to improve the performance of the engine, each of these induction passages may be tuned for ramming the air into the engine cylinders 20.

The air meter 54 is mounted on the inlet projecting from the side of the manifold 52 for drawing the filtered air from inside of the plenum chamber 46 and delivering it to the intake manifold 52 for distribution to the cylinders. The air meter 54 comprises a generally cylindrical housing having a substantially cylindrical passage extending therethrough with a throttle valve 55 disposed in the downstream end thereof for regulating the quantity of induction air flowing into the engine. In addition, the air meter 54 may include any suitable metering restriction such as a venturi to develop a pressure signal indicative of the amount of air flow. In the present instance this restriction includes a tapered member 62 that projects into the inlet end of the passage. The exterior of this member 62 is adapted to cooperate with the interior of the passage and cause the cross-sectional area to vary similar to that of a venturi. An annular port 63 is provided in the housing to sense the vacuum developed by the air flowing through the meter 54. This vacuum will be indicative of the volume of air flowing through the engine 12.

The fuel injection system 38 includes a fuel metering mechanism 64 and a transfer pump for insuring delivery of an uninterrupted supply of fuel from a storage tank to the metering mechanism 64. The metering mechanism 64 includes a housing having a float bowl portion 66 on one end which is interconnected with the transfer pump and a metering portion 68 on the opposite end.

An injector pump 70 driven from any suitable source such as the distributor shaft may be located in the bottom of a float bowl so as to discharge fuel under pressure from the pump outlet. This outlet includes a passage that extends diagonally through the housing to intersect the bottom of a fuel distributor 72 located in the fuel metering portion 68. This distributor 72 includes a cylindrical passage 74, the lower end of which forms an inlet interconnected with the pump outlet to receive the fuel therefrom. A pressure sensitive check valve 75 may be disposed in the inlet to maintain at least some predetermined pressure in the fuel anterior thereto. A valve guide 76 may be disposed in the passage 74 to form an annulus 78 interconnected with the injector lines 80 and to form a plurality of spill ports 86. Thus after the fuel passes the check valve 75 it will divide into two portions, the first portion, the metered fuel will pass from the annulus 78 through the injector lines 80 to be discharged from the nozzle 84, the second portion, the surplus fuel passes through the spill ports 86 in the guide member 76 for return to the fuel bowl.

The volume of the metered fuel is controlled by regulating the amount of fuel by-passed through the spill ports 86. This, in turn, is regulated by a plunger valve 88 reciprocably disposed in an axial passage through the valve guide 76 and having the lower end thereof registering with the spill ports. 86. All of the nozzles 84 include a small discharge jet which together with the resistance of the injector lines 80 produce a hydraulic resistance. Therefore the pressure of the fuel in the distributor 72 will be indicative of the amount of metered fuel discharged through the nozzles 84. Since the piston valve 88 is subject to this pressure, there will be an upward force thereon proportional to the amount of fuel flow tending to open the valve 88 and increase the amount of fuel by-passed through the spill ports 86.

The metering portion 68 of the fuel meter 64 includes a diaphragm chamber 90 interconnected with the annular port in the air meter 54 and a linkage chamber 92 that contains a linkage 96 operatively interconnecting a diaphragm 98 with the plunger valve 88. This linkage 96 includes a vertical pin 99 having the upper end thereof connected to the diaphragm 98 and the lower end thereof connected to a pivoted joint 100 between a counterweight lever 102 and a control lever 104. The counterweight lever 102 is pivoted about a fixed point 106 while the control lever 104 rotates about the end of an adjustable mixture control or ratio arm 108. Thus the outer end of the control lever 104 rests on and tends to depress the plunger valve 88 and thereby close the spill ports 86.

It may thus be seen that as the induction air passes through the air meter 54 a vacuum signal will be transmitted to the diaphragm chamber 90 and exert a force on the diaphragm 98 proportional to the amount of air flow. The pin 99 connected to the diaphragm 98 will lift the end of the control lever 104 so that the opposite end will produce a downward force on the plunger valve 88. This will oppose the upward force on the valve 88 produced by the fuel pressure. As a result the two opposed forces will cause the plunger valve 88 to move axially to increase or decrease the amount of spill fuel until the two forces are in balance. When these forces are in balance the air and the metered fuel will be flowing in some predetermined proportions. These proportions of air and fuel will be determined by the mechanical advantage of the linkage 96 and more particularly the control lever 104. This, of course, is dependent upon the position of the ratio arm 108 which forms the fulcrum for the control lever 104.

Normally, an engine operates at part load and, accordingly, it is highly desirable to normally supply the cylinders with a lean charge suitable for maximum economy. Under circumstances where maximum power is required and economy is of secondary importance, the charge is made richer so as to enable the development of maximum power. Although there are numerous ways in which this objective can be accomplished, it has been found advantageous to retain the mixture control arm 108 normally positioned for maximum economy and to provide maximum power enrichment means 112 for moving the arm 108 to a rich position for producing a rich charge suitable for maximum power. During part load operation the throttle is only partially open and, consequently, there is a considerable amount of induction vacuum, whereas during maximum power operation the throttle valve is substantially fully open and the induction vacuum is very small. Accordingly, the present enrichment means 112 includes a diaphragm 114 connected to the ratio arm 108 through the medium of a first link 116, a crank 118 and a second link 120 and is disposed in a housing 122 to form a diaphragm chamber 124. This chamber 124 is interconnected with a fitting 128 projecting from the side of the air meter 54 by an enrichment vacuum line 132. This fitting 128 includes a passage 134 that communicates with the induction system 36 posterior to the throttle valve 55 so as to sense the induction vacuum. When the throttle 55 is at least partially closed the vacuum will cause the diaphragm 114 to pull on the link 116 and rotate the end of the crank 118 against a lean stop 136. This stop 136 is adjusted to position the ratio arm 108 suitable for a maximum economy charge. When the throttle valve 55 opens and there is very little vacuum the spring 138 will push on the diaphragm 114 and moves the crank 118 against the rich stop 140 which is set to insure the ratio arm 108 producing a charge suitable for maximum power.

Thus normal induction vacuum will retain the crank 118 against the lean stop 136, thereby insuring a suitable charge for maximum economy. However, a low induction vacuum when present in the diaphragm chamber 124 will retain the crank 118 and the rich stop 140, thereby insuring a suitable charge for maximum power.

When the temperature of the engine 12 is below normal, a lean charge suitable for maximum economy will not necessarily insure a satisfactory operation of the engine. Accordingly, under such circumstances it is desirable to provide a charge of richer proportions than normal. Thus a thermostatic enrichment means 142 may be provided for enrichment of the charge during subnormal temperatures.

In the present instance this thermostatic enrichment means 142 includes a housing 144 having a vent valve 146 and a thermostatic spring element 147 that controls the valve 146. The valve 146 comprises a plunger 148 that reciprocably fits into a cylinder 150 having an atmospheric vent 152 adjacent one end. The opposite end is interconnected with the fitting 128 in the side of the air meter 54 by a bleed line 155. The upper end of the plunger 148 may include a rigid link 156 that has one end thereof connected to an arm 157 so as to be positioned by the tension of the spring 147.

Although the thermostatic spring 147 may be heated directly from the heat produced by the engine 12 it has been found advantageous to heat the spring 147 by an electrical heating element 160. This heating element 160 may be interconnected with the engine ignition system so that it will be heated when the ignition is turned on. However, it has been found preferable to interconnect this element with the voltage regulator so that there will be no heating of the element 147 until the generator voltage exceeds the battery voltage. Consequently, even though the ignition is turned on there will be no heating of the spring element 147 unless the engine is actually running.

In addition, it has been found desirable to employ a fast idle cam 162 for positioning the throttle valve 55 when the temperature is subnormal. This cam 162 is positioned by a link 164 connected to the arm 157 and it includes a stepped surface 166 on the periphery that is adapted to engage the end of the fast idle adjusting screw 168. If desired, a lost motion connection 170 may be provided to allow the fast idle and/or the enrichment action to be maintained for different periods.

It may thus be seen that when the engine temperature is below normal, the thermostatic element 147 will contract and simultaneously set the cam 162 for fast idle and raise the plunger valve 146. This will partially open the throttle valve 55 to increase the idle speed and also will allow air to flow from the vent 152 through the cylinder 150 into the bleed line 155 and to the fitting 128. The air will then flow through the fitting 128 and into the induction system 36. Consequently, irrespective of the amount of vacuum present in the induction system 36, the vacuum enrichment line 132 will fail to transmit a large vacuum to the diaphragm chamber 124. Consequently, the spring 138 will be able to force the crank 118 against the rich set screw and set the ratio arm 108 so that the metering action will produce a rich charge suitable for operation at subnormal temperature. As the heating element 160 heats the thermostatic spring 147, the spring tension will relax and cause the fast idle cam 162 to progressively move towards the slow position and the plunger valve 146 to descend and close the vent 152. When this occurs the flow of air through the bleed line 155 and to the fitting 128 will be eliminated. As a result the induction vacuum may be transmitted through the vacuum enrichment line 132 to the diaphragm chamber 124. A resilient seal 172 may be provided on the end of the plunger 148 to close the end of the opening 174 to prevent interference with the induction vacuum even if the piston leaks. Thus the desired metering action will be restored, i.e., during part load operation the diaphragm 114 will compress the spring 138 and produce a lean charge suitable for maximum economy.

What is claimed is:

1. A fuel injection system for an internal combustion engine, said system comprising an induction system for supplying air to the cylinders of said engine, an inlet to said induction system including a throttle valve for regulating the volume of said air flow, a fuel metering mechanism responsive to a signal indicative of the amount of said air flow for metering the fuel in some predetermined proportion to the air flow, temperature responsive means, and electrical means effective during operation of said engine to heat said temperature responsive means, said temperature responsive means being effective to change the proportions of said fuel when the temperature thereof exceeds some predetermined amount, said temperature responsive means being effective to simultaneously prevent said throttle closing more than some predetermined amount when said temperature is below said amount.

2. In a fuel injection system for a multicylinder internal combustion engine, the combination of an induction system having means therein to create a signal proportional to the amount of the air flow therethrough, fuel metering means responsive to said signal and effective to inject metered fuel into the charge in some predetermined proportion to said air flow and thermostatic means adapted to change the effectiveness of said signal, electrical means for heating said temperature responsive means, said temperature responsive means being effective to increase the proportion of fuel to air when the temperature is less than some predetermined amount.

3. A charge forming unit for an internal combustion engine comprising an induction system adapted to supply air to the cylinders of said engine, fuel metering means adapted to distribute equal increments of metered fuel to said cylinders and including a fuel metering valve and a diaphragm operatively interconnected therewith by a linkage, said diaphragm being responsive to the fuel demands of said engine for actuating said metering valve in proportion thereto, and thermostatic means for changing the mechanical advantage of said linkage to thereby change the proportions of air and fuel in said charge when said engine is operating at subnormal temperatures.

4. A charge forming unit for an internal combustion engine having a plurality of cylinders, said unit comprising an induction system adapted to supply a charge of air to said cylinders, and including means for creating a pressure signal indicative of said air flow, fuel metering means adapted to distribute equal increments of metered fuel to said cylinders and including a fuel metering valve and a diaphragm responsive to said signal, a linkage interconnecting said diaphragm with said valve, said linkage normally having a mechanical advantage effective to actuate said metering valve so that said metered fuel will flow in some predetermined proportion to said air flow, and thermostatic means for changing the mechanical advantage of said linkage to thereby increase the proportion of fuel in said charge when said engine is operating at subnormal temperatures.

5. A charge forming unit for an internal combustion engine having a plurality of cylinders, said unit comprising an induction system for supplying a charge of air to said cylinders and having a throttled inlet and means for creating a pressure signal indicative of the amount of the air flow, fuel means including a metering valve effective to control the amount of fuel flow to said cylinders, a diaphragm responsive to said pressure signal, a linkage operatively interconnecting said diaphragm with said valve for regulating the amount of said fuel flow in some predetermined proportion to said air flow, and pressure sensitive means interconnected with said linkage and responsive to the induction vacuum to maintain said linkage adjusted for a lean charge when said vacuum exceeds some predetermined amount, and thermostatic means for bleeding air into said pressure sensitive means when the temperature of said engine is below some predetermined amount.

6. A charge forming unit for an internal combustion engine having a plurality of cylinders, said unit comprising an induction system adapted to supply a charge of air to said cylinders and including means for creating a pressure signal indicative of the amount of said air flow, fuel metering means adapted to distribute equal increments of metered fuel to said cylinders and including a fuel metering valve and a diaphragm responsive to said signal, a linkage interconnecting said diaphragm with said valve and including a lever whose mechanical advantage will determine the proportion of air and fuel in the resultant charge, thermostatic means for changing the mechanical advantage of said lever to thereby change the proportions of said charge when said engine is operating at subnormal temperatures.

7. A charge forming unit for an internal combustion engine having a plurality of cylinders, said unit comprising an induction system adapted to supply a charge of air to said cylinders and including means for creating a pressure signal indicative of the amount of said air flow, fuel metering means adapted to distribute equal increments of metered fuel to said cylinders and including a fuel metering valve and a diaphragm responsive to said signal, a linkage interconnecting said diaphragm with said valve and including a lever pivoting about a fulcrum the position of which determines the proportion of fuel and air in the resultant charge, thermostatic means for changing the position of said fulcrum to increase the proportion of fuel when said engine is below some predetermined amount.

8. A charge forming unit for an internal combustion engine having a plurality of cylinders, said unit comprising an induction system for supplying a charge of air to said cylinders and having an inlet with a throttle valve therein for regulating the air flow, means for creating a pressure signal indicative of the amount of said air flow, fuel means including a metering valve effective to control the amount of fuel flow to said cylinders, a diaphragm responsive to said pressure signal, a linkage interconnecting said diaphragm with said metering valve, pressure sensitive means responsive to the induction vacuum to maintain said linkage normally adjusted for a lean charge, and thermostatic means for bleeding air into said pressure sensitive means when the temperature is below some predetermined amount so that said pressure sensitive means will adjust said linkage for producing a rich charge.

9. A charge forming unit for an internal combustion engine having a plurality of cylinders, said unit comprising an induction system adapted to supply a charge of air to said cylinders and including means for creating a pressure signal indicative of the amount of said air flow, fuel metering means adapted to distribute equal increments of metered fuel to said cylinders and including a fuel metering valve and a diaphragm responsive to said signal, a linkage interconnecting said diaphragm with said valve and including a lever pivoting about a fulcrum the position of which determines the proportion of fuel and air in the resultant charge, pressure sensitive means interconnected with said fulcrum and responsive to the induction vacuum to retain said fulcrum positioned suitable for a lean charge when said vacuum is in excess of some predetermined amount, and thermostatic means for bleeding air into said pressure sensitive means to cause said means to move said fulcrum into position for a rich charge when the temperature thereof is less than some predetermined amount.

10. The combination of claim 8 wherein said thermostatic means is also effective to simultaneously prevent said throttle valve closing more than some predetermined amount.

References Cited in the file of this patent
UNITED STATES PATENTS

| | | |
|---|---|---|
| 2,071,633 | Hunt | Feb. 23, 1937 |
| 2,165,447 | Browne | July 11, 1939 |
| 2,245,672 | Hunt | June 17, 1941 |
| 2,309,170 | Beaumont | Jan. 26, 1943 |
| 2,710,604 | Snyder | June 14, 1955 |